Nov. 21, 1933.　　　N. A. PALMGREN　　　1,935,782
COIL FRICTION CLUTCH
Filed Feb. 26, 1932　　　2 Sheets-Sheet 1

INVENTOR
NILS ARVID PALMGREN
BY
his ATTORNEY

Nov. 21, 1933.  N. A. PALMGREN  1,935,782
COIL FRICTION CLUTCH
Filed Feb. 26, 1932   2 Sheets-Sheet 2
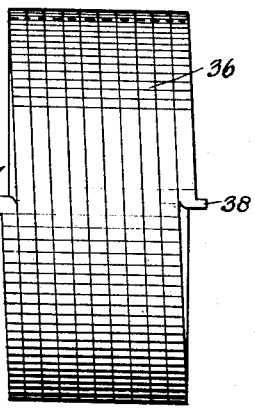
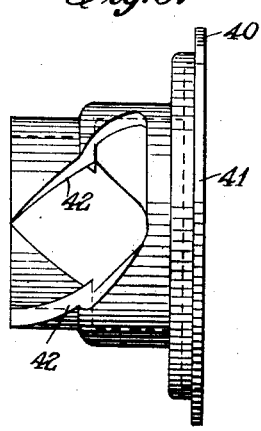
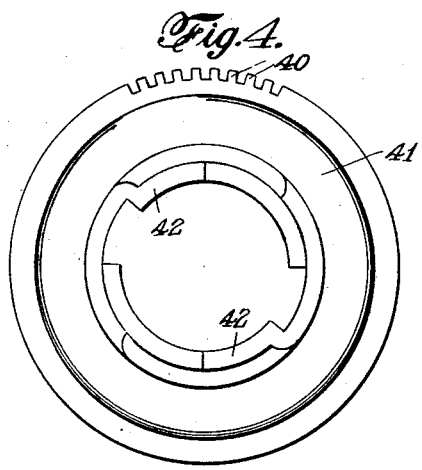
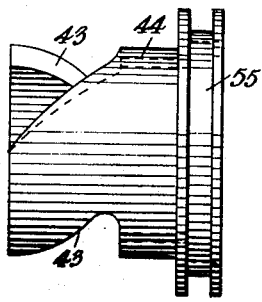
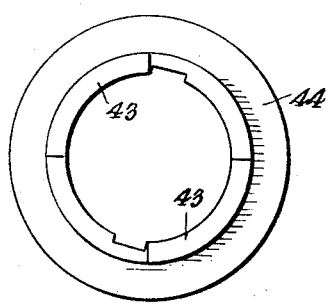
INVENTOR
NILS ARVID PALMGREN
BY
ATTORNEY Patented Nov. 21, 1933

1,935,782

UNITED STATES PATENT OFFICE 1,935,782

COIL FRICTION CLUTCH

Nils Arvid Palmgren, Gottenborg, Sweden

Application February 26, 1932, Serial No. 595,239, and in Sweden December 2, 1930

3 Claims. (Cl. 192—.01)

The object of the present invention is to provide a coil friction clutch which gradually accelerates the stationary member in the manner of friction clutches in general in contradistinction to the usual manner of clutches of this type which grip suddenly. The invention is applicable to coil friction clutches in which two co-axial shafts cooperate with a helical band or the like which by expansion or contraction is brought into frictional engagement with one or both shafts to transmit torque in one rotational direction from one shaft to the other.

The invention consists mainly in that the band is fixed at both ends to members operatively connected to one of the shafts and that the points of fixation can be turned to bring them into different relative circumferential positions by means of a suitable operating mechanism. The band can thus be brought successively and under control into frictional engagement with the other shaft.

My invention is described in the following with particular reference to the attached drawings which illustrate an embodiment of the invention. In which drawings:

Fig. 2 shows in side elevation the coil spring.

Figs. 3 and 4 show a side view and end view respectively of the rotatable sleeve, and Figs. 5 and 6 show a side view and end view respectively of the slidable sleeve.

Figure 1:
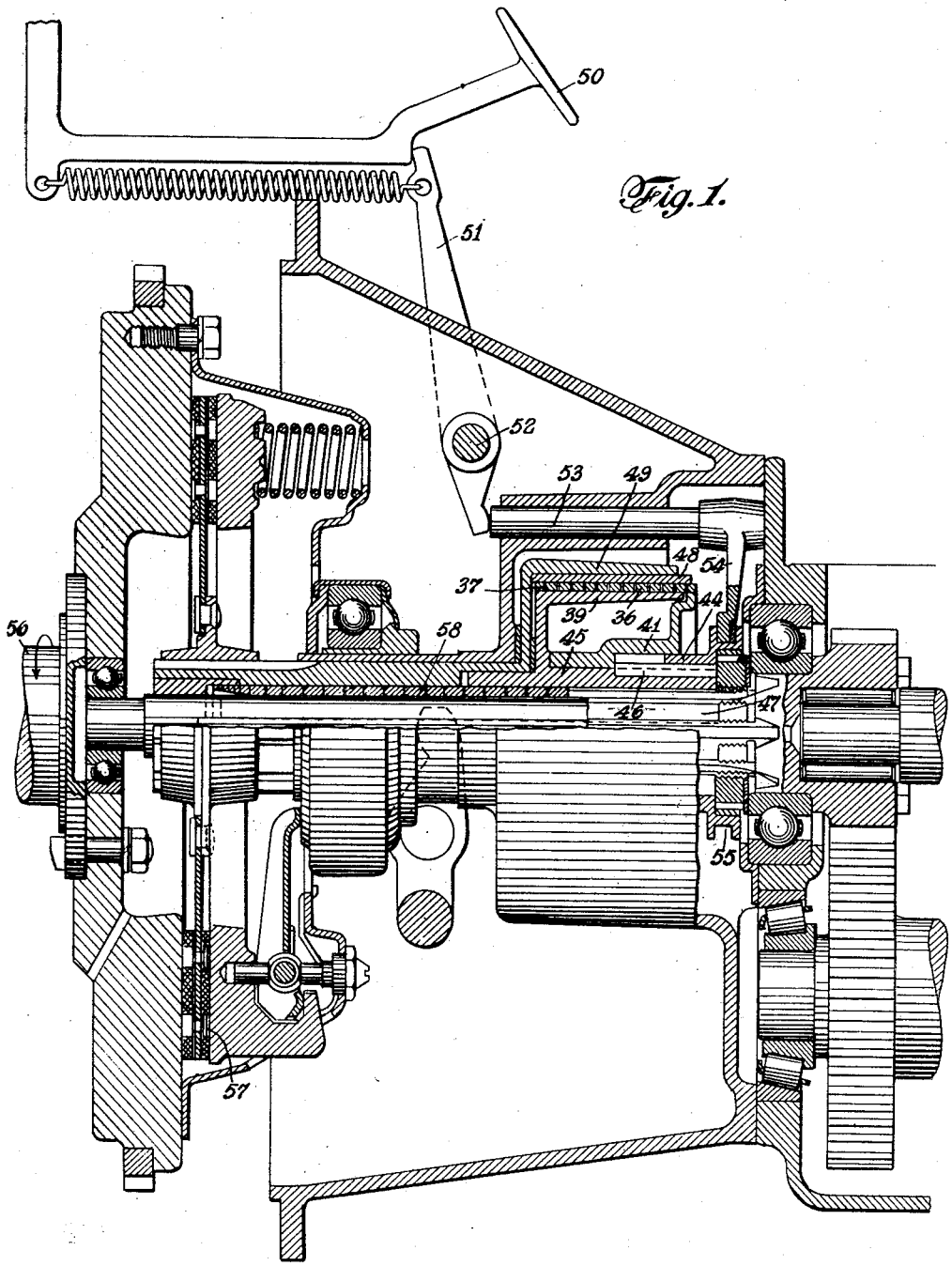
Figure 1 illustrates in longitudinal section the invention applied to an automobile clutch.

In the form shown in the drawings, my invention is illustrated as applied to an automobile clutch, the band engaging the internal surface of a hollow cylinder. The coiled band 36 is shown as being wound in the direction of a right-handed screw, the direction of rotation of the primary shaft 56 being that indicated by the arrow.

The ends of the coil, see Fig. 2, are bent outwardly forming lugs 37 and 38 for attaching the coil to the proper parts. The lug 37 is held between projections on a cylindrical member 39. The other lug 38 is held between a selected pair of a group of teeth 40 formed on a rotatable member 41. The number of teeth 40 is sufficient to enable the initial diameter of the spring to be adjusted. This adjustment is so made that the spring of its own accord tends to press against the internal surface of a bronze sleeve 48 located within the member 49. The member 41 is provided with screw surfaces 42 adapted to engage corresponding screw surfaces 43 on an axially slidable member 44. The member 44 is axially slidable on a cylindrical part 45 of the member 39, but is prevented from turning relative to this member by a key 46. The member 45 is in turn splined to the shaft 47. If the member 44 is moved toward the right to the position illustrated in the figure the member 41, as seen from the right in the figure, turns in a direction opposite to that of the hands of a clock and the spring is constricted and the clutch disengaged. The return movement is due to the tension of the band 36. The band tending to expand and engage the surface of the sleeve 48 thereby turns the member 41 clockwise and moves the member 44 to the left in the drawings.

The clutch is shown as being operated from a pedal 50. When the pedal is pushed down the lever 51 is turned counter-clockwise about the pivot 52 and pushes the bar 53 to the right. On one end of the bar 53 is a forked shift lever 54 engaging a groove 55 in the member 44 which is thus moved to the position shown and the clutch disengaged. When the pedal is released the spring action of the coiled band 36 reverses the direction of movement of all the parts and the clutch is engaged.

The object of the clutch shown is to engage the shaft 47 to the shaft 56, when it is desired to use the motor as a brake. When the motor is driving, the forces pass the friction clutch 57 and the coiled spring clutch 58, while the above described clutch is out of action. The pedal 50 is the usual accelerator pedal. When this pedal is depressed the coiled band 36 is disengaged. When it is permitted to move to the right of the position shown in Fig. 1 the coiled band 36 is gradually engaged and the shaft 56 gradually accelerated. In the position shown in Fig. 1 the coupling is acting as a free wheel clutch.

Having thus described my invention, what I claim and desire to secure by Letters Patent is:

1. In a transmission for motor vehicles and the like, the combination with a primary shaft and a gear box, of a friction clutch, a connecting member engaging the friction clutch, unidirectional clutches constructed and adapted to connect the connecting member to the primary shaft of the gear box, one of said unidirectional clutches comprising a clutch member engaging the connecting member and a clutch member engaging the primary shaft of the gear box, a cooperative helical spring attached at one end to one of the clutch members and at the other end to a rotatably mounted sleeve and adapted to be brought into frictional engagement with the other clutch member by rotating said sleeve for interconnecting the said clutch members, means operatively connecting said sleeve to the accelerator pedal of the vehicle and adapted to rotate said sleeve upon movement of the pedal, and said pedal.

2. In a transmission for motor vehicles and the like the combination with a primary shaft and a gear box, of a friction clutch, a connecting member engaging the friction clutch, said connecting member having an internal band engaging surface, a cooperative helical spring band disposed therein and having one end connected to the primary shaft and adapted to transmit torque in a direction from the motor to the driving wheels, a clutch member engaging the connecting member and a clutch member engaging the primary shaft of the gear box, and a cooperative helical spring connected at one end to one of the clutch members and adapted to be brought into frictional engagement with the other clutch member to transmit torque in a direction from the driving wheels to the motor.

3. In a transmission for motor vehicles and the like, the combination with a primary shaft and a gear box, of a friction clutch, a connecting member engaging the friction clutch, unidirectional clutches constructed and adapted to connect the connecting member to the primary shaft of the gear box, one of the said unidirectional clutches being capable of disengagement and being operatively connected to means for governing the speed of the motor, and such means.

NILS ARVID PALMGREN.